March 20, 1962 G. H. BINGHAM, JR., ET AL 3,025,545
METHOD OF PROVIDING AN ARTICLE MADE OF MOLDABLE MATERIAL
WITH A DISTINCTIVE SURFACE AREA, FOR
INSTANCE, AN ARTIFICIAL SEAM
Filed Oct. 22, 1959 4 Sheets-Sheet 1
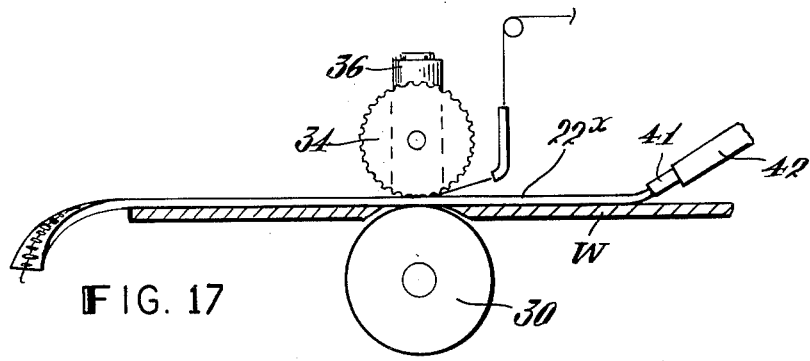
FIG. 17
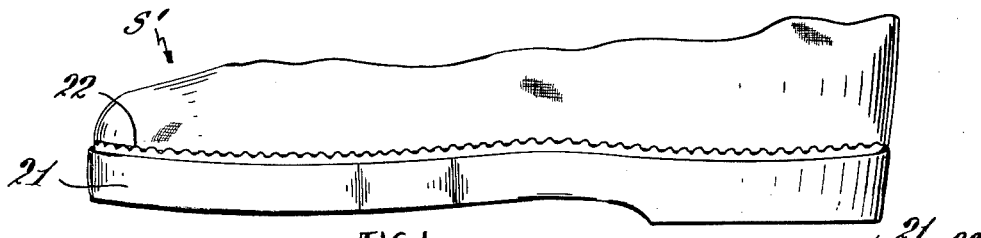
FIG. 1
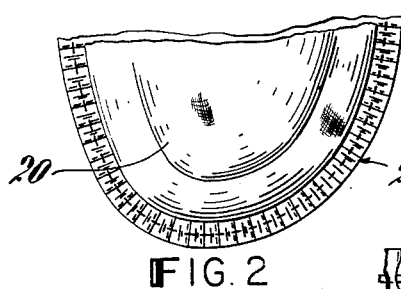
FIG. 2
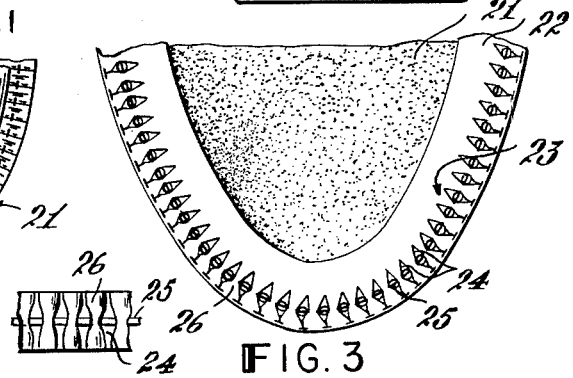
FIG. 3
FIG. 5a
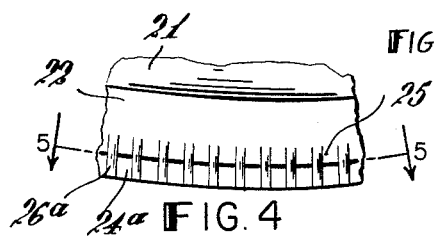
FIG. 4
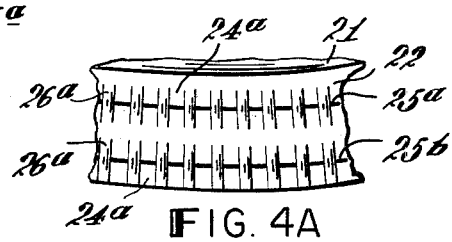
FIG. 4A
FIG. 5
INVENTORS
George H. Bingham, Jr.
Robert J. Kenworthy
by Roberts Cushman & Grooves
ATT'YS.

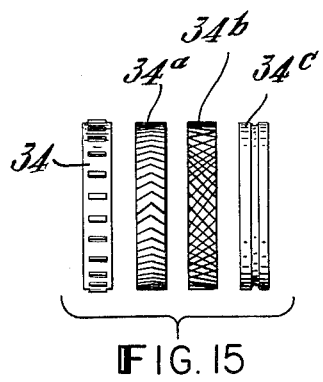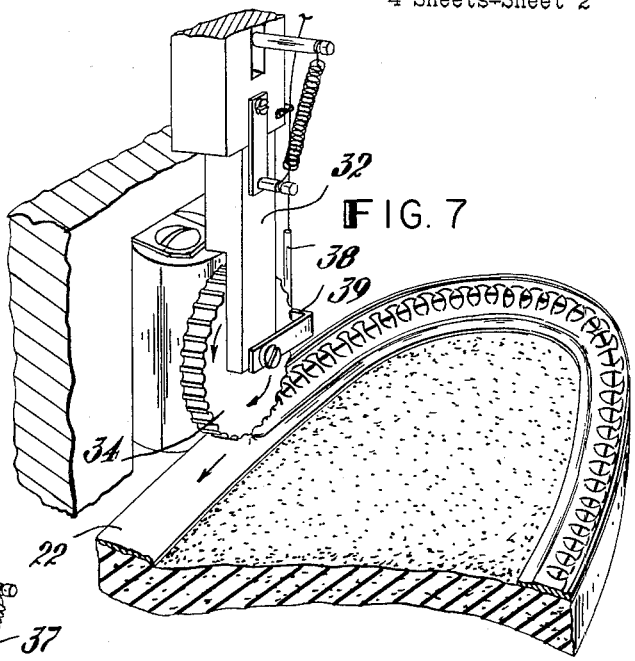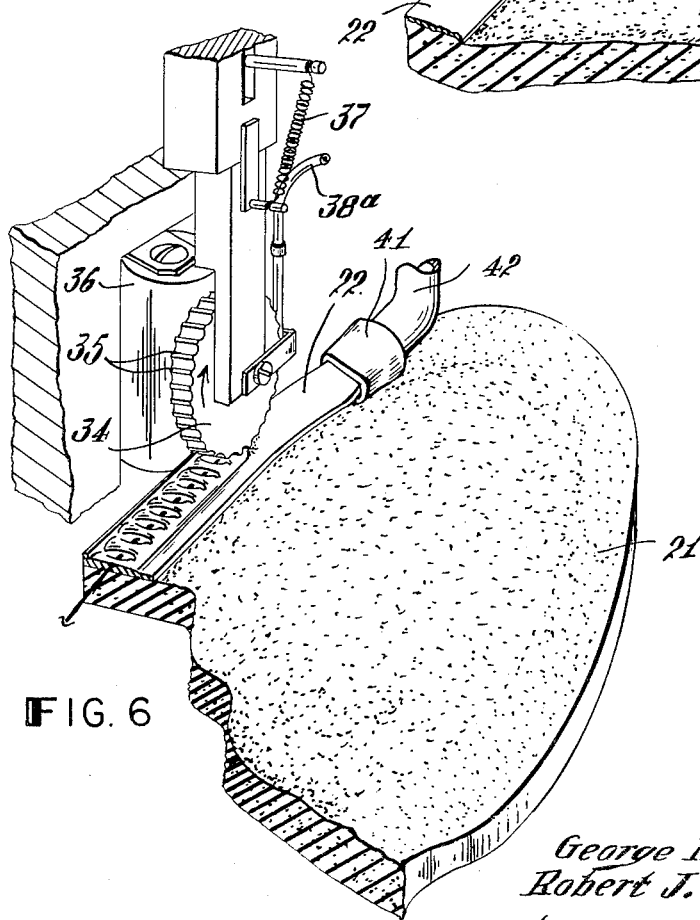

March 20, 1962 G. H. BINGHAM, JR., ET AL 3,025,545
METHOD OF PROVIDING AN ARTICLE MADE OF MOLDABLE MATERIAL
WITH A DISTINCTIVE SURFACE AREA, FOR
INSTANCE, AN ARTIFICIAL SEAM Filed Oct. 22, 1959 4 Sheets-Sheet 3

INVENTORS
George H. Bingham, Jr.
Robert J. Kenworthy
by
ATT'YS.

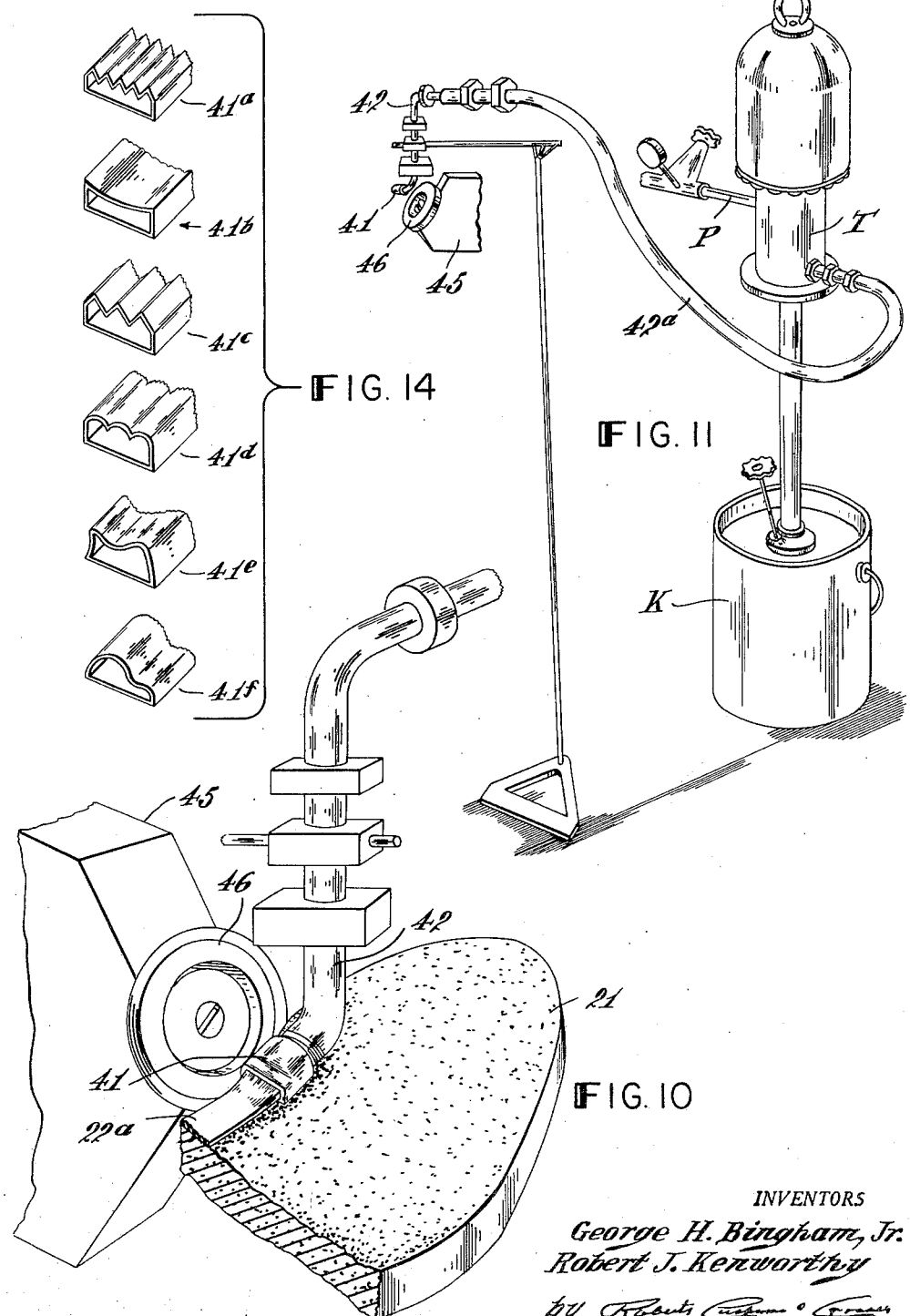

United States Patent Office 3,025,545
Patented Mar. 20, 1962

3,025,545
METHOD OF PROVIDING AN ARTICLE MADE OF MOLDABLE MATERIAL WITH A DISTINCTIVE SURFACE AREA, FOR INSTANCE, AN ARTIFICIAL SEAM
George H. Bingham, Jr., Westminster, Md., and Robert J. Kenworthy, Gettysburg, Pa., assignors to Cambridge Rubber Company, Taneytown, Md., a corporation of Maryland
Filed Oct. 22, 1959, Ser. No. 847,987
4 Claims. (Cl. 12—146)

This invention pertains to the manufacture of footwear or other articles made of or comprising a moldable material, for example, a moldable rubber compound or a plastic, and relates more particularly to a novel method of and apparatus for use in providing an article made of such moldable material with a distinctive surface area, for instance, as a specific example, but without limiting intent, an artificial seam. In a more specific aspect the invention concerns a method of and apparatus for use in providing an outersole with an imitation seam so arranged that when the sole is secured to a lasted upper, the resultant shoe appears to have a welt.

An object of the invention is to provide a novel method of providing an article of moldable material, such as rubber or plastic, with an area of distinctive appearance, for instance, an imitation seam.

A further object is to provide a novel method of providing a shoe outersole, comprising a moldable rubber compound or plastic, with an imitation welt.

A further object is to provide a novel method of so applying a thread to an article made of a moldable material as to give the appearance of a sewed seam, but without the employment of a needle or other work penetrating element.

A further object is to provide an article of footwear with an outersole, having an imitation welt comprising a material of a color or other characteristic difference from that of the sole proper and, if desired, to incorporate in said welt an imitation seam comprising an actual thread.

A further object is to provide an overshoe, having a waterproof sole, with a foxing strip of moldable material of a predetermined shape in transverse section, and of a color different if desired, from that of the outersole or upper.

A further object is to provide a strip of moldable material with a longitudinally extending, imitation seam, with an incorporated thread which, either before or after complete curing, may be applied to a shoe or other article as an ornamental braid.

In the attainment of the above objects, the article which is to be provided with the distinctive surface area, for specific example an imitation seam and which is in moldable condition (for example, a partially cured rubber compound) is provided with a series of indentations (elongate transversely of the length of the desired seam) with intervening protrusions of the material resultant, for example, from subjecting the article to the action of a toothed embossing wheel or roll, after which the article is fully cured, the alternating indentations and intervening protrusions of the material then giving the general effect of a stitched seam.

In a preferred embodiment, wherein the imitation seam embodies an actual thread, the thread which is to be employed in the formation of the seam is progressively fed and laid upon the surface of the article, the latter being in moldable condition, and regularly spaced indentations, elongate transversely of the thread, are formed in the article in such a way that at each indentation the thread is held down under tensile stress while at the same time the moldable material is caused to protrude and cover those portions of the thread which intervene between the indentations. Thus, between adjacent protrusions of the material, the thread is exposed. The article is then cured and the short, spaced exposed portions of the thread provide a close imitation of an actual sewed seam, although as a matter of fact the thread lies in substantially a straight line and does not penetrate the article.

Other objects and advantages of the invention will be pointed out in the following more detailed description and by reference to the accompanying drawings wherein:

FIG. 1 is a fragmentary side elevation showing an overshoe having an outersole provided with an imitation welt in accordance with one embodiment of the present invention;

FIG. 2 is a fragmentary top view of the toe portion of the shoe of FIG. 1, showing one form of imitation seam;

FIG. 3 is a fragmentary top view of an outersole, prior to its assembly with a lasted shoe upper, having an imitation seam of the kind which includes an actual thread or strand of a material different from that of the outersole itself;

FIG. 4 is a fragmentary plan view showing another form of seam;

FIG. 4a is a view similar to FIG. 4, but showing an article provided with two parallel seams like the single seam shown in FIG. 4;

FIG. 5 is a fragmentary vertical section substantially on the line 5—5 of FIG. 4;

FIG. 5a is a fragmentary plan view, illustrating the seam of FIG. 3 to larger scale;

FIG. 6 is a fragmentary perspective view showing a portion of an outersole to which a marginal ribbon of moldable material is being applied and illustrating the formation of an imitation seam which, if desired, comprises a thread of plastic material;

FIG. 7 is a fragmentary plan view showing a portion of an outersole generally similar to FIG. 6, but wherein the imitation seam includes an actual thread like the seam of FIG. 3;

FIG. 10 is a fragmentary perspective view illustrating apparatus for use in, and the method of, applying to an outersole a marginal ribbon of material, for example, of a different color than that of the outersole proper, for use in making an imitation welt of ornamental appearance or as an adhesive bond for use in connecting the outersole to a lasted upper;

FIG. 11 is a perspective view showing means for supplying ribbon-forming material to the apparatus of FIG. 10;

FIG. 14 is a composite perspective view showing various types of nozzle which may be used in the apparatus of FIGS. 10 and 11 in the application of a ribbon of plastic material to another part;

FIG. 15 is a composite elevation showing stitch-forming wheels having operative peripheral edges of different configurations;

FIG. 17 is a fragmentary perspective view illustrating apparatus for use in the formation of a ribbon such as shown in FIG. 16.

Figure 8:
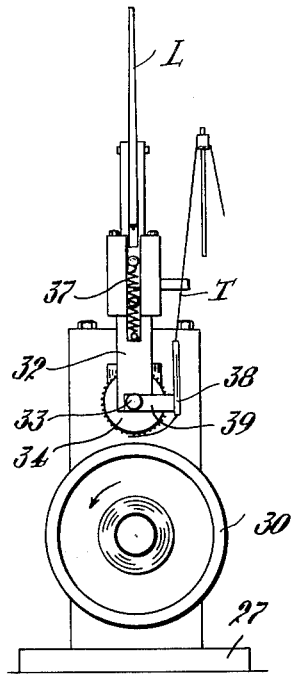
FIG. 8 is an end elevation of apparatus useful in forming an imitation seam in the manner illustrated in FIG. 6 or 7.

Referring to the drawings, and in particular to FIG. 1, the character S' indicates a shoe illustrative of one utility of the present invention. This shoe comprises the upper 20, the outersole 21, which may, for example, be of rubber or the like, and an imitation welt 22 in which is formed a mock seam. The general appearance of this seam when viewed from above is substantially as is illustrated in FIG. 2. This seam, together with the welt 22, is formed prior to the bonding of the outersole to the lasted upper, and FIG. 3 illustrates, to larger scale, the appearance of the toe end of the outersole after it has been prepared in accordance with the present invention in readiness for union with the lasted upper. As shown in this view the welt comprises a ribbon-like strip 22 of material adhesively united to the upper surface of the outersole 21 and extending along the margin of the latter. While the mock seam 23 is shown as comprising a row of spaced depressions 24 with a strand 25 of a contrasting color of material, exposed at the bottom of each depression and with an upwardly protruding mass 26 between each pair of depressions forming a rib extending transversely of the row of depressions, and which conceals the strand 25 (if the latter be continuous) in the interval between adjacent depressions. The appearance of a mock seam of this general type is shown to even larger scale in FIG. 5a, and if it be assumed that the strand 25 which is exposed at the bottom of each depression 24 is a continuous thread or the like, it will be seen from inspection of FIG. 5a that the upwardly protruding ribs 26 of the moldable material forming the ribbon 22 have been forced upwardly and inwardly so that the portion of the strand which intervenes between adjacent depressions is buried in this upwardly protruded material so that it is concealed thereby.

The mock seam, illustrated in FIGS. 3 and 5a, has transversely extending ribs and depressions of a special form intended closely to resemble the appearance of the seam which unites an outersole of a conventional leather shoe to the welt. However, the present invention is not limited with respect to the particular shape of the depressions and transverse ribs. For example, as illustrated in FIG. 4, the ribs 26a are shown as substantially rectilinear, upward protrusions of the moldable material, and the depressions 24a are substantially rectangular. In FIG. 4a two parallel rows of ribs 26a and depressions 24a are shown, one row containing strand 25a and the other strand 25b.

In the above description it has been indicated that a ribbon 22 of moldable material has been secured to the upper surface of the outersole 21 preparatory to the formation of the mock seam. Such an arrangement is particularly desirable if the shoe is to have the appearance of having a welt as illustrated in FIG. 1, and this described procedure makes it possible to use an outersole which has been fully cured before the mock seam is formed. However, if it is not required that the shoe have the appearance of having a welt, then it is possible, in accordance with the present invention, to form the mock seam directly in the material of the outersole itself, providing the material of the outersole, at the time, is only partially cured so that it is still moldable. In any event, after the formation of the mock seam, the subsequent curing of the material in which the indentations have been formed makes the upwardly protruding ribs permanent so that the appearance of the seam is retained during the wear of the shoe.

Figure 9:
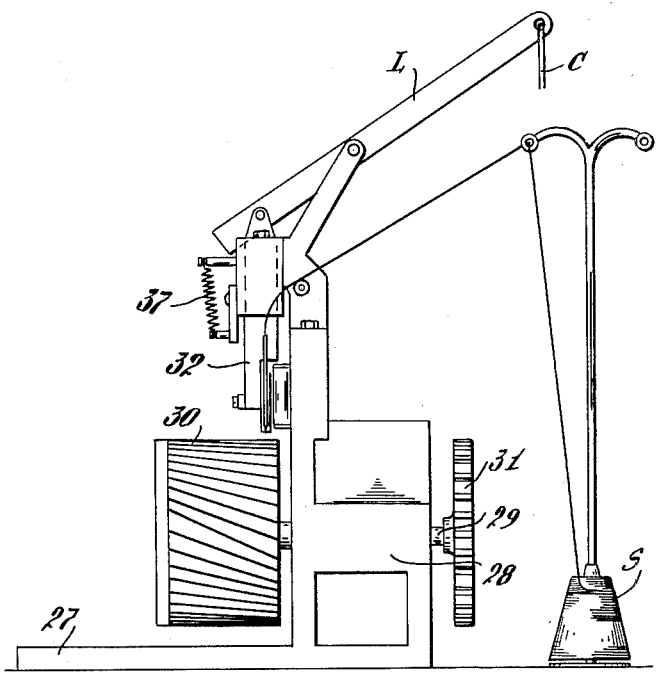
FIG. 9 is a side elevation of the apparatus shown in FIG. 8.

In FIG. 6 there is diagrammatically illustrated the operation of forming the welt strip and the mock seam in a single continuous operation, and in FIGS. 8 and 9 apparatus is shown in greater detail for forming the mock seam, either in a simulated welt, such as the part 22 above described, or directly in an outersole, while in FIGS. 10 and 11 there is illustrated apparatus useful in applying a ribbon of moldable material such as the strip 22 to an outersole whether or not said strip is later to be processed so as to provide a mock seam.

Referring first to FIGS. 8 and 9, a desirable apparatus for forming the mock seam is illustrated as comprising a base member 27 forming a part of the machine frame 28, the latter having bearings for a horizontal, rotatable shaft 29, on one end of which is mounted a work-supporting feed wheel 30. At the other end of this shaft there is fixed a gear wheel 31 which, it may be understood, will be driven by engagement with another gear wheel which is turned either by hand or by power means, as preferred.

The frame is provided with guide means for a vertically movable slide member 32 having bearings for a stub shaft 33 on which is mounted a freely turning wheel or roller 34 having a toothed peripheral edge. The teeth on the edge of this wheel or roller are designed to form the indentations in the moldable material and accordingly will be of a shape to form indentations of the selected type. Thus, for example, as illustrated in FIG. 15, the wheel 34 has substantially rectangular, transversely elongate teeth such as would form indentations like the indentations 24a of FIG. 4. The wheel 34a has teeth which would form indentations of another shape; the wheel 34b has teeth of still another type, while wheel 34c has a peripheral groove such as would form a longitudinally extending rib in the moldable material. A spring 37 is arranged to urge the slide 32 downwardly and thus to force the toothed wheel 34 downwardly against a work piece supported by the feed wheel 30. Desirably, a lever L is provided which is connected by means (not shown) to the upper end of the slide 32 and which has a long arm to which may be secured a cord or chain C leading down to a treadle (not shown), whereby the operator may readily raise the toothed wheel 34 to permit the work piece to be introduced between it and the feed wheel 30.

In accordance with one embodiment of the invention, the slide 32 is provided with a bracket 39 to which is secured a thread guide 38, into which a thread T may be delivered from a supply spool S so that, as the wheel 34 rotates, the lower portion of this thread will be dragged down and laid upon the upper surface of the work just in advance of the point at which the wheel 34 contacts the work.

In a modified construction, as illustrated in FIG. 6, this thread guide 38 may be replaced by a tubular member 38a of small diameter, through which a plastic material may be delivered to form a thread-like strand which will be laid upon the surface of the work just before the work is contacted by the wheel 34. Such material may be of a color contrasting with that of the ribbon or strip 22, if desired, thus to provide an ornamental effect, where this strand or thread is exposed at the bottoms of the indentations or depressions between the ribs.

Figure 13:
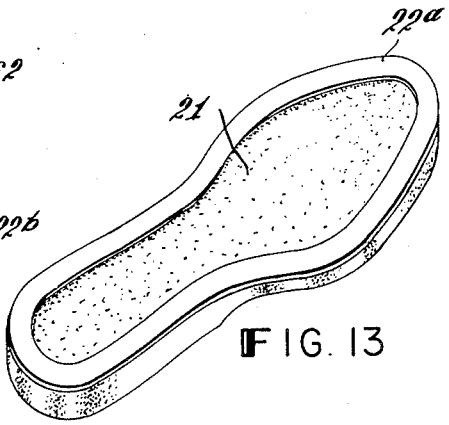
FIG. 13 is a perspective view showing an outersole which has been provided with a marginal ribbon or band, as illustrated in FIG. 10, in readiness for the formation of a mock seam to imitate a welt, or to be employed in bonding the outersole to a lasted upper.

Referring to FIGS. 10 and 11, there is shown an arrangement for applying a ribbon of moldable material, such as the strip 22a, to the upper surface of a sole 21 which, for example, may be a fully or partially cured sole of rubber, rubber compound or the like, or a leather or composition sole. This apparatus, as illustrated, comprises a frame 45 which supports an edge guide roll 46 for contact with the peripheral edge of the sole to assist the operator in guiding the sole relatively to a nozzle 41, through which the material to form the ribbon or strip 22a is discharged. This nozzle 41, is at the end of a supply conduit 42, connected by a flexible tube 42a to a pressure tank T, to which compressed air or other gas may be supplied through a valve-controlled pipe P. The fluent material which is to be discharged from the nozzle is received from a container K, from which it may be pumped into the tank T. Assuming that the material which is thus to be delivered is of a kind which is initially fluent but sets upon exposure to air at normal atmospheric temperatures, the operator will place the edge of the sole 21 against the edge guide roll 46, and, by moving the sole around, the fluent material, exuding from the nozzle 41, will form a marginal ribbon-like strip 22a which is adherent to the upper surface of the sole and which rapidly sets sufficiently to maintain its shape. A sole which has been thus provided with a marginal strip of moldable material is illustrated in FIG. 13, and a sole thus prepared and while the strip 22 is still in moldable condition, may be passed through the apparatus of FIGS. 8 and 9, with the result that the upper surface of the strip of moldable material will be given the appearance illustration, for example, in FIG. 3. If a thread or filament of extruded plastic is provided, and if this thread or filament be of a color different from that of the strip 22, a very distinct and ornamental appearance results, and it may be remarked that the material of the strip 22 may be of any desired color or kind capable of being applied in the manner above described.

Instead of applying the strip 22 and then forming the mock seam as successive independent operations, it is possible, as illustrated in FIG. 6, to combine the two operations, the latter figure indicating the position of a nozzle 41, such as the nozzle 41 of FIG. 10, arranged to deliver the moldable material to form a strip 22 just so far in advance of the point of action of the wheel 34 that the moldable material will have set enough so that it will not flow freely. Obviously, if this material be such as sets more rapidly when exposed to heat, a suitable source of heat may be provided, although not here shown, for heating the strip immediately it leaves the nozzle 41, or if the material be such as sets more rapidly by contact with some special gas or vapor, or with cold air, then suitable means may be provided, although not here shown, for so treating the strip before it reaches the wheel 34. It will be understood that in this apparatus the operator will place the peripheral edge of the sole 21 against the guide roll 36 provided for the purpose, and will move the sole about, as is customary in many shoe making operations, so as progressively to bring successive portions of the margin of the sole beneath the nozzle 41 and then beneath the indenting wheel 34, thus providing the welt and mock seam in a single continuous operation.

Figure 12:
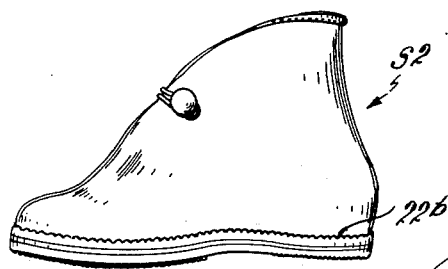
FIG. 12 is a side elevation to smaller scale showing a shoe provided with a foxing strip of ornamental appearance.

While the nozzle 41, as illustrated in FIG. 10, is shaped to produce a strip 22a of substantially rectangular transverse section, nozzles of other shapes may be employed if it be desired to provide the sole or some other part with strips of other shape. For such purposes nozzles such as those illustrated in FIG. 14 at 41a to 41f inclusive, may be used, it being understood that these various shapes are merely illustrative of the infinite number of shapes which may be designed for the purpose. Likewise, it is contemplated that apparatus such as that shown in FIGS. 10 and 11, may be employed for applying a strip or ribbon of moldable material to other parts of the shoe than to the outersole, for example, for applying a strip of such material to the lower part of the upper of a lasted shoe $S^2$ to form a foxing, as illustrated at 22b in FIG. 12.

Figure 16:
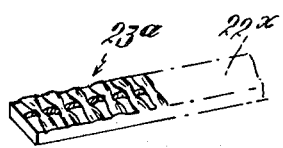
FIG. 16 is a fragmentary perspective view illustrating a ribbon of material, for example, a foxing strip, provided with an imitation seam for ornamental effect.

While the mock seam above described has been suggested as desirable to impart to an outersole the appearance of having a welt and welt seam, it is contemplated that a mock seam made in a similar way may be employed for other purposes. For example, in FIG. 16 there is illustrated a ribbon-like strip 22x of a moldable material having formed in its upper surface alternating depressions and ribs with an embedded thread, giving the appearance of a seam as shown at 23a, FIG. 16. Such a strip of material, after it has been partially cured, may be applied to a shoe or other article as a trim element, and then after application it may be cured to permanent consistency. On the other hand, the strip may be cured before application and then united to the part with which it is to be associated by the use of adhesive, stitches or other fastening means. In FIG. 17, there is diagrammatically illustrated apparatus useful in making such a strip, wherein the numeral 30 indicates a driven supporting and feed-wheel; the numeral 34 designates a toothed wheel such as the wheel 34 above described; and the numeral 36 designates an edge guide roll such as the guide roll 36 of FIG. 6. In this arrangement the nozzle 41 is arranged to deliver the fluent material on to a horizontal support W, along which it moves into contact with the feed wheel 30 which advances the strip past the toothed indenting wheel 34 while the edge guide roll 36 keeps the edge of the strip in proper relation to the latter. After leaving the wheel 30 the indenting strip may be supported in any suitable way until it has completely set, and the strip may then be rolled or otherwise prepared for shipment or storage prior to its use.

While certain desirable embodiments of the invention have herein been illustrated and described by way of example, it is to be understood that the invention is broadly inclusive of any and all modifications falling within the scope of the appended claims.

We claim:

1. That method of forming an artificial seam in a material which is in moldable condition, said method comprising as steps: laying a strand upon the surface of the material, forming in the surface of the material a row of indentations, said row extending lengthwise of the strand along the length of the desired seam and each indentation extending transevrsely of the length of the strand, thereby causing intervening portions of the material to bulge upwardly in the form of transversely elongate ribs while applying tensile stress to said strand sufficient, during formation of said indentations to bury and conceal said strand in the upwardly bulging material while leaving the strand exposed only at each indentation, and curing the material thereby to make permanent the ribs, said ribs and intervening indentations having the appearance of a sewed seam.

2. That method of forming an artificial seam according to claim 1, wherein the material is advanced progressively, longitudinally of the desired seam, said strand comprises a material which is non-plastic at the temperature used to form said indentations, and the depressions are formed by a rotatable toothed wheel.

3. That method of providing a shoe sole with an artificial welt which comprises as steps: depositing upon the upper surface of the marginal portion of the sole a ribbon of a material which is of a character such as to adhere to the sole, and, while said ribbon of material is in moldable condition, forming in its upper surface a row of stitch length indentations, said row extending longitudinally of the ribbon, each depression being elongate transversely of said row, the formation of the depressions causing intervening portions of the material of the ribbon to bulge upwardly in the form of spaced, transversely elongate ribs, so laying a thread upon the upper surface of the ribbon of moldable material that the thread extends longitudinally of the ribbon and parallel to the edge of the ribbon, applying tensile stress to said thread during the formation of said indentations such as to bury and conceal the thread within the substance of each rib, leaving the thread exposed only at the indentations, and curing the material forming the ribbon thereby to make the ribs permanent.

4. That method of making shoes which comprises as steps: forming, from selected material, an outersole of desired shape and size, laying a ribbon of fluent material upon the upper surface of the sole along the margin of the latter, said fluent material being of a kind which sets when exposed to the air, but which is capable of being made adhesive, laying a thread-like strand upon the surface of the ribbon, so forming in said ribbon a longitudinally extending row of indentations separated by protruding ribs that each indentation extends transversely of the thread-like strand, and simultaneously, with the formation of said protruding ribs, applying tensile stress to said strand such that the strand is buried and concealed within the material of each rib while leaving the strand exposed only at each indentation, and thereafter utilizing said ribbon for adhesively bonding the sole to a lasted upper.

References Cited in the file of this patent

UNITED STATES PATENTS

| | | | |
|---|---|---|---|
| Re. 19,555 | Sleeper | Apr. 30, | 1935 |
| 894,332 | Krewson | July 28, | 1908 |
| 999,161 | Hadaway | July 25, | 1911 |
| 1,169,085 | Davis | Jan. 18, | 1916 |
| 1,318,340 | Arnold et al. | Oct. 7, | 1919 |
| 1,869,476 | Hamann | Aug. 2, | 1932 |
| 2,161,902 | Riley | June 13, | 1939 |
| 2,517,347 | Ouimet | Aug. 1, | 1950 |
| 2,546,553 | Majtner | Mar. 27, | 1951 |
| 2,574,611 | Baker | Nov. 13, | 1951 |
| 2,922,236 | Rubico | Jan. 26, | 1960 |